(12) United States Patent
Gailus

(10) Patent No.: US 12,420,260 B2
(45) Date of Patent: Sep. 23, 2025

(54) CARBON NANOTUBE SHEET FOR AIR OR WATER PURIFICATION

(71) Applicant: Nanocomp Technologies, Inc., The Woodlands, TX (US)

(72) Inventor: David Gailus, Merrick, NH (US)

(73) Assignee: Nanocomp Technologies Inc., The Woodlands, TX (US)

(*) Notice: Subject to any disclaimer, the term of this patent is extended or adjusted under 35 U.S.C. 154(b) by 298 days.

(21) Appl. No.: 17/801,305

(22) PCT Filed: Mar. 1, 2021

(86) PCT No.: PCT/US2021/020264
§ 371 (c)(1),
(2) Date: Aug. 22, 2022

(87) PCT Pub. No.: WO2021/178300
PCT Pub. Date: Sep. 10, 2021

(65) Prior Publication Data
US 2023/0086059 A1    Mar. 23, 2023

Related U.S. Application Data

(60) Provisional application No. 62/983,795, filed on Mar. 2, 2020.

(51) Int. Cl.
*B32B 9/00*    (2006.01)
*B01D 46/00*    (2022.01)
(Continued)

(52) U.S. Cl.
CPC ........ *B01J 20/205* (2013.01); *B01D 46/0036* (2013.01); *B01D 53/0438* (2013.01);
(Continued)

(58) Field of Classification Search
CPC .............. C01B 32/158; C01B 2202/34; C01B 2202/36; B82Y 30/00; Y10T 428/30; B01D 2279/40
(Continued)

(56) References Cited

U.S. PATENT DOCUMENTS 6,454,834 B1    9/2002    Livingstone et al.
9,731,971 B2    8/2017    Cooper et al.
(Continued)

FOREIGN PATENT DOCUMENTS

EP        1433515 B1    9/2008
JP    2004508169 (2004)    *    3/2004
(Continued)

OTHER PUBLICATIONS

Supplemental European Search Report received in the corresponding European Application No. 21765010.0, issued Feb. 9, 2024.
(Continued)

*Primary Examiner* — Daniel H Miller
(74) *Attorney, Agent, or Firm* — Nanocomp Technologies Inc.; David K. Wooten

(57) ABSTRACT

The present disclosure provides a filter for removing contaminants from a liquid or gaseous medium including a woven or nonwoven sheet of entangled carbon nanotubes. The present disclosure also provides a method for reducing the concentration of contaminants in a liquid or gaseous medium by contacting the liquid or gaseous medium with the filter.

5 Claims, 9 Drawing Sheets

(51) Int. Cl.
  *B01D 53/04* (2006.01)
  *B01J 20/20* (2006.01)
  *B01J 20/28* (2006.01)
  *C01B 32/158* (2017.01)
  *C02F 1/28* (2023.01)
  *B60H 3/06* (2006.01)
  *B82Y 30/00* (2011.01)

(52) U.S. Cl.
  CPC ... *B01J 20/28007* (2013.01); *B01J 20/28011* (2013.01); *B01J 20/28038* (2013.01); *B01J 20/28061* (2013.01); *C01B 32/158* (2017.08); *C02F 1/283* (2013.01); *B01D 2253/102* (2013.01); *B01D 2253/304* (2013.01); *B01D 2253/306* (2013.01); *B01D 2253/34* (2013.01); *B01D 2259/40096* (2013.01); *B01D 2279/40* (2013.01); *B01D 2279/50* (2013.01); *B60H 3/0658* (2013.01); *B82Y 30/00* (2013.01); *C01B 2202/32* (2013.01); *C01B 2202/34* (2013.01); *C01B 2202/36* (2013.01); *C01P 2004/54* (2013.01); *C01P 2006/10* (2013.01); *C02F 2303/16* (2013.01)

(58) Field of Classification Search
  USPC .......................................................... 428/408
  See application file for complete search history.

(56) References Cited

U.S. PATENT DOCUMENTS

| | | |
|---|---|---|
| 2009/0068461 A1 | 3/2009 | Reneker et al. |
| 2016/0166959 A1 | 6/2016 | Cui et al. |
| 2018/0194950 A1 | 7/2018 | Antoinette et al. |
| 2019/0218099 A1 | 7/2019 | Huynh |

FOREIGN PATENT DOCUMENTS

| | | | |
|---|---|---|---|
| JP | 2017051384 A | | 3/2017 |
| KR | 20170060468 A | | 6/2017 |
| KR | 101867522 B1 | | 6/2018 |
| KR | 20040056134 A | | 6/2018 |
| WO | WO 2007015710 | * | 2/2007 |
| WO | 2018/110771 A1 | | 6/2018 |

OTHER PUBLICATIONS

International Search Report and Written Opinion received in the corresponding PCT Application No. PCT/US2021/020264, completed May 22, 2021 and mailed Jul. 7, 2021.

* cited by examiner

CARBON NANOTUBE SHEET FOR AIR OR WATER PURIFICATION

CROSS-REFERENCE TO RELATED APPLICATIONS

The present application is the National Phase of International Application PCT/US2021/020264 filed Mar. 1, 2021 which designated the U.S. and which claims priority to U.S. Provisional Patent Application No. 62/983,795, filed Mar. 2, 2020, the entire contents of which is hereby expressly incorporated by reference.

STATEMENT REGARDING FEDERALLY SPONSORED RESEARCH OR DEVELOPMENT

This invention was made with Government support under DE-AR0001017 awarded by DOE, Office of ARPA-E. The Government has certain rights in this invention.

FIELD

The present disclosure generally relates to a filter for removing contaminants from a liquid or gaseous medium where the filter includes a nonwoven or woven sheet of a plurality of entangled carbon nanotubes. The present disclosure also relates to a method of making such a filter and to methods for removing contaminants from a liquid or gaseous medium using the filter.

BACKGROUND

A substantial number of liquid and gaseous streams contain organic and/or metallic contaminants which must be removed for various reasons, such as consumption, use, disposal or other needs. Non-limiting examples of contaminated liquid streams include those emanating from municipal water supplies, ground water streams and waste water streams resulting from manufacturing processes. Contaminated gaseous streams may contain organic contaminants and/or metal contaminants in the form of metal vapors or vapors of compounds that contain one or more metals.

Various conventional techniques exist for removing such contaminants, particularly when the contaminants are organic. Such techniques include air stripping, and bubbling air directly into the contaminated stream by use of diffusers. While these techniques have proven to be somewhat effective, each has their drawbacks including the release of the stripped organics into the environment as air borne contaminants and an increase in operating costs. Another technique often used is adsorption of the contaminants onto a solid adsorbent material, such as zeolite or charcoal. Charcoal is both inexpensive and has a high surface area (>1000 $m^2$/gram). However, it is brittle and can be difficult to form into a durable useable form. Because charcoal is typically used in the form of a particle bed, the fluid flow path through the adsorbent material is tortious resulting in a high fluid flow loss in actively circulated systems or long diffusion pathways in passive systems. Furthermore, while charcoal can be reactivated by heat, regeneration times are longer than desired due to the flow limitations described above.

More recently, carbon nanotubes and graphene have been used as a partial or complete replacement of charcoal. For example:

U.S. Pat. No. 5,458,784 discloses graphitic filaments characterized as having: (i) a surface area from 50-800 $m^2$/g; (ii) an electrical resistivity of 0.3-0.8 μohm·m; (iii) a length of 1-100 μm; and (iv) a distance of 0.335-0.7 nm between graphite platelets and their use in removing organic and metallic components from aqueous and gaseous streams;

U.S. Pat. Appl. Publ. No. 2004/0131811 discloses a filter for an air conditioner that includes carbon nanotubes having nano-sized metal particles deposited thereon;

U.S. Pat. Publ. No. 2006/0120944 discloses a material formed from graphene and carbon nanotubes and its use as a filter in gas and liquid purification;

U.S. Pat. Appl. Publ. Nos. 2006/0151382 and 2011/0114573 disclose the use of graphene in filtration medium;

U.S. Pat. No. 7,419,601 discloses the use of carbon nanotubes in the form of an assembled nanomesh to remove contaminants from a fluid where the carbon nanotubes are either connected or attached to other carbon nanotubes, fibers or particles;

U.S. Pat. Appl. Publ. No. 2009/0142576 discloses a carbon nanotube film disposed on a porous supporting substrate and its use as a filter;

WO 2012/070886 discloses a filter for removing organic contaminants from air that includes a carbon nanotube-catalyst composite in which the catalyst particles have a size of ones of nanometers and are uniformly bound to the carbon nanotubes;

U.S. Pat. Appl. Publ. No. 2013/0042762 discloses a gas filter having a chamber containing carbon nanotubes disposed between an inlet and an outlet and a port configured for simultaneous gas ingress to and gas egress from the carbon nanotubes through the port; and U.S. Pat. No. 9,078,942 discloses a filtration membrane coated with titanium dioxide/single wall CNTs.

It would be desirable to further improve upon these state of the art filtration medium by developing new carbon nanotube-based materials that exhibit even better filtration capabilities and can be regenerated easily and quickly using minimal energy.

SUMMARY

A filter for removing contaminants from a liquid or gaseous medium comprising a woven or nonwoven sheet of entangled carbon nanotubes characterized as having two or more of the following characteristics: (i) a diameter of between about 2-20 nm, (ii) a length of between about 1-10 mm, (iii) a density of between about 0.7-1.9 g/$cm^3$, (iv) an aspect ratio of at least about 250,000, (v) a strain to failure of between about 1.8-7%, and (vi) a surface area from about 100-300 $m^2$/g and wherein the woven or nonwoven sheet further comprises an input configured for receiving energy from a power source.

DETAILED DESCRIPTION

Figure 1:
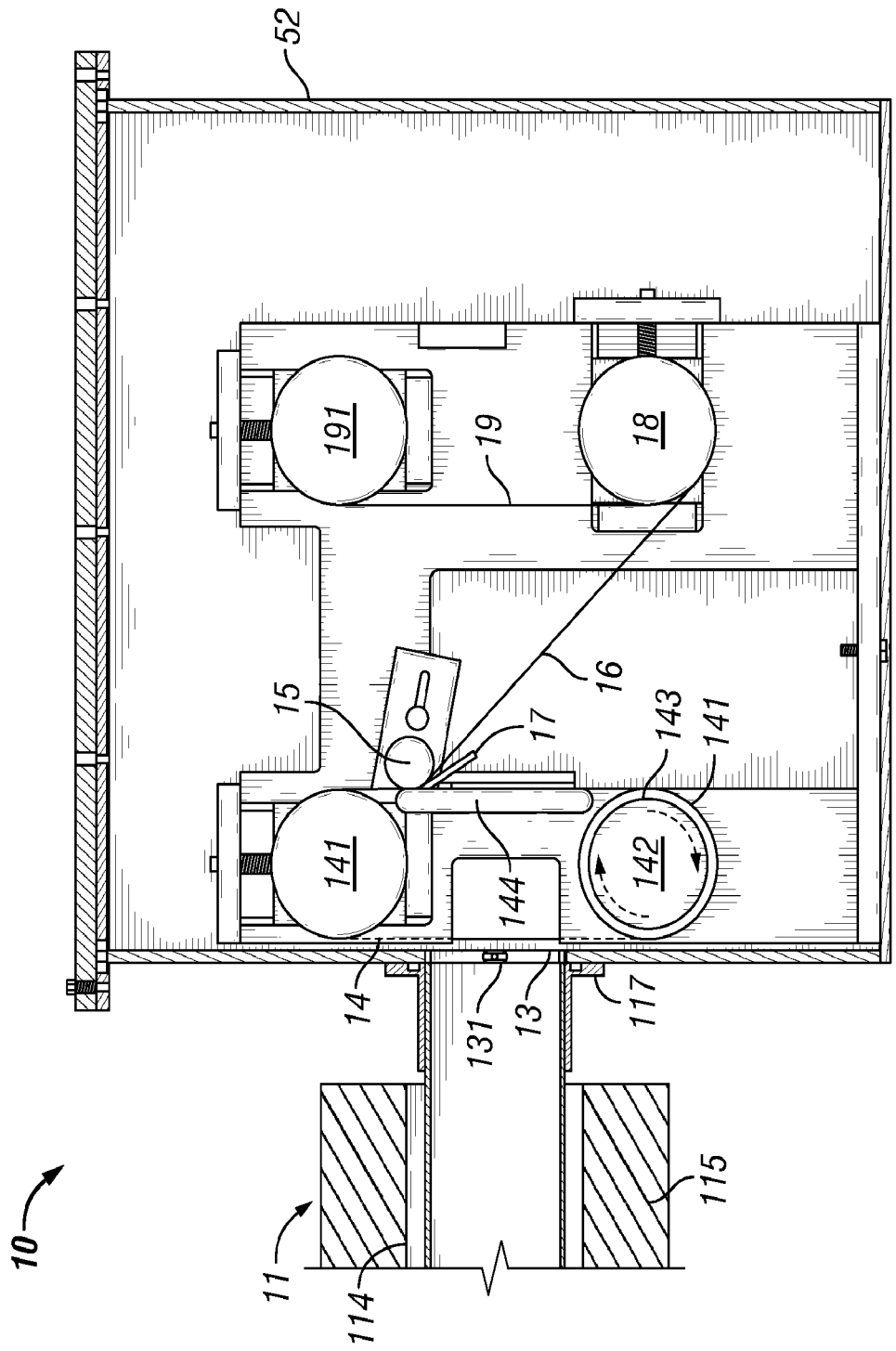
FIGS. 1 and 2 illustrate a system for formation and harvesting of a nonwoven sheet of entangled carbon nanotubes in accordance with one embodiment of the present disclosure.

The present disclosure generally provides a filter for removing contaminants from a liquid or gaseous medium where the filter comprises a woven or nonwoven sheet of entangled carbon nanotubes characterized as having one or more of the following characteristics: (i) a diameter of between about 2-20 nm, or between about 3-18 nm, or between about 4-15 nm, or between about 5-14 nm, or between about 6-12 nm, or between about 8-11 nm (ii) a length of between about 1-10 mm, or between about 2-9 nm, or between about 3-8 nm, or between about 4-7 nm, or between about 5-6 nm (iii) a density of between about 0.7-1.9 g/cm$^3$, or between about 0.75-1.8 g/cm$^3$, or between about 0.8-1.7 g/cm$^3$, or between about 1-1.6 g/cm$^3$, or between about 1.1-1.5 g/cm$^3$, (iv) an aspect ratio of at least about 250,000, or at least about 350,000, or at least about 500,000, or at least about 600,000 (v) a strain to failure of between about 1.8-7%, or between about 2-6.5% or between about 3-5%, (vi) and a surface area from about 100-300 m$^2$/g, or from about 125-275 m$^2$/g, or from about 150-250 m$^2$/g or from about 175-225 m$^2$/g and where the woven or nonwoven sheet further includes an input for receiving electrical energy from a power source. In some further embodiments, in addition to the characteristics above, the entangled carbon nanotubes may be also characterized as having a tensile strength of between about 2-3.2 GPa, or between about 2.25-3 GPa, or between about 2.5-2.8 GPa and/or a specific strength of between about 1800-2900 kN·M/kg, or between about 2000-2700 kN·M/kg or between about 2200-2600 kN·M/kg.

It has been surprisingly found that the particular woven or nonwoven sheet of carbon nanotubes of the present disclosure can be effectively employed as a sorbent for numerous contaminants disposed in a liquid and/or gaseous medium, and can be easily regenerated in place within a matter of minutes, such as less than 0.5 minutes, or less than 1 minute, or less than 2 minutes, or less than 3 minutes, by application of electrical energy to the nonwoven sheet. The woven or nonwoven sheet of carbon nanotubes, made in accordance with embodiments of the present disclosure, can act to efficiently radiate in the far infrared spectrum as a result of the electrical current passing through it. This creates an efficient heating article that is able to radiate in the far infrared in all directions without heating itself up to revolatilize and/or decompose the contaminants disposed within the filter.

The filter described herein may find use in various applications including, but not limited to, home (for e.g. domestic water and air filtration), automotive (for e.g. cabin air filter in an HVAC system) recreational (for e.g. environmental filtration), industrial (for e.g. solvent reclamation, reactant purification), governmental (for e.g. military uses, waste remediation), and medical (for e.g. operating rooms, clean air and face masks) locations.

The present disclosure also provides a method of purifying a liquid or gaseous medium containing one or more contaminants by contacting the liquid or gaseous medium with the woven or nonwoven sheet of carbon nanotubes in the filter described herein. In one embodiment, the method of purifying the liquid or gaseous medium includes contacting the liquid or gaseous medium with the woven or nonwoven sheet, wherein the carbon nanotubes are present in the woven or nonwoven sheet in an amount sufficient to reduce the concentration of at least one contaminant in the liquid or gaseous medium that comes into contact with the woven or nonwoven sheet. By "reduce the concentration of at least one contaminant" means a reduction of at least one contaminant to a level below that of the untreated liquid or gaseous medium, such as below the maximum contamination levels as defined by appropriate regulatory agencies or industrial requirements governing the quality standards of the particular liquid or gaseous medium, after being treated with the inventive filter.

The following terms shall have the following meanings:

The term "comprising" and derivatives thereof are not intended to exclude the presence of any additional component, step or procedure, whether or not the same is disclosed herein. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or more than one (i.e. to at least one) of the grammatical object of the article.

The phrases "in one embodiment", "according to one embodiment" and the like generally mean the particular feature, structure, or characteristic following the phrase is included in at least one aspect of the present disclosure, and may be included in more than one aspect of the present disclosure. Importantly, such phases do not necessarily refer to the same aspect.

If the specification states a component or feature "may", "can", "could", or "might" be included or have a characteristic, that particular component or feature is not required to be included or have the characteristic.

As used herein, the term "contaminant" refers to any compound and/or mixture of compounds that is considered undesirable and/or detrimental to the medium in which the compound and/or mixture of compounds is disposed. Thus, contaminants that are particularly contemplated under this definition include various metals, salts, acids and/or organic compounds, each of which may be present in a gaseous medium (for e.g., ambient air, process air) or a liquid medium (for e.g., water). It should be recognized that suitable contaminants can be readily identified by a person of ordinary skill in the art without undue experimentation. However, it is particularly preferred that contemplated contaminants may include optionally substituted organic compounds (for e.g., but not limited to, crude oil, refined hydrocarbons, chloroform, acteonitrile, benzene, methyl isobutyl ketone, isopropyl alcohol, n-butyl alcohol, n-propyl alcohol, ethylene glycol, diethylene glycol, 2-ethoxyethyl acetate, methyl ethyl ketone, naphthalene, pyrene, anthracene, acenaphthylene, phenanthrene, chrysene, fluroanthene, fluorene, benzopyrene, benzoanthracene, benzofluoranthene, indenopyrene, dibenzoanthracene, benzo parylene, chlorobenzene, bromobenzene, 1,2-dichlorobenzene, 1,3-dibromobenzene, 1,4-dichlorobenzene, 1,2,4-trichlorobenzene, hexachlorobenzene, 2-chloronaphthalene, 2-bromonaphthalene, 3,3'-dichlorobenzidine, toluene, ethylbenzene, o-xylene, m-xylene, p-xylene, diphenylmethane, dodecylbenzene, mesitylene, durine, and hexamethylbenzene), metals in elemental form (for e.g., mercury) or in ionic form (for e.g., $Cu^{2+}$), acids (for e.g., $HNO_3$, $H_3PO_4$, $H_2SO_4$, lactic acid, etc.), bases (for e.g., NaOH, KOH, $HSO^-$, etc.), halogens (e.g., $Cl_2^-$, $Cl^-$, etc.), salts of the above acids and bases, and numerous other chemical compounds, including small molecule drugs (MW typically less than 1000) and chemical agents (for e.g., Sarin, Soman, VX Mustard Gas, and Lewisite). Thus, included within "contaminants" are volatile organic compounds or VOCs, i.e., compounds possessing a boiling point equal to or less than 216° C. at atmospheric pressure as determined by ASTM D 86-96.

Figure 2:
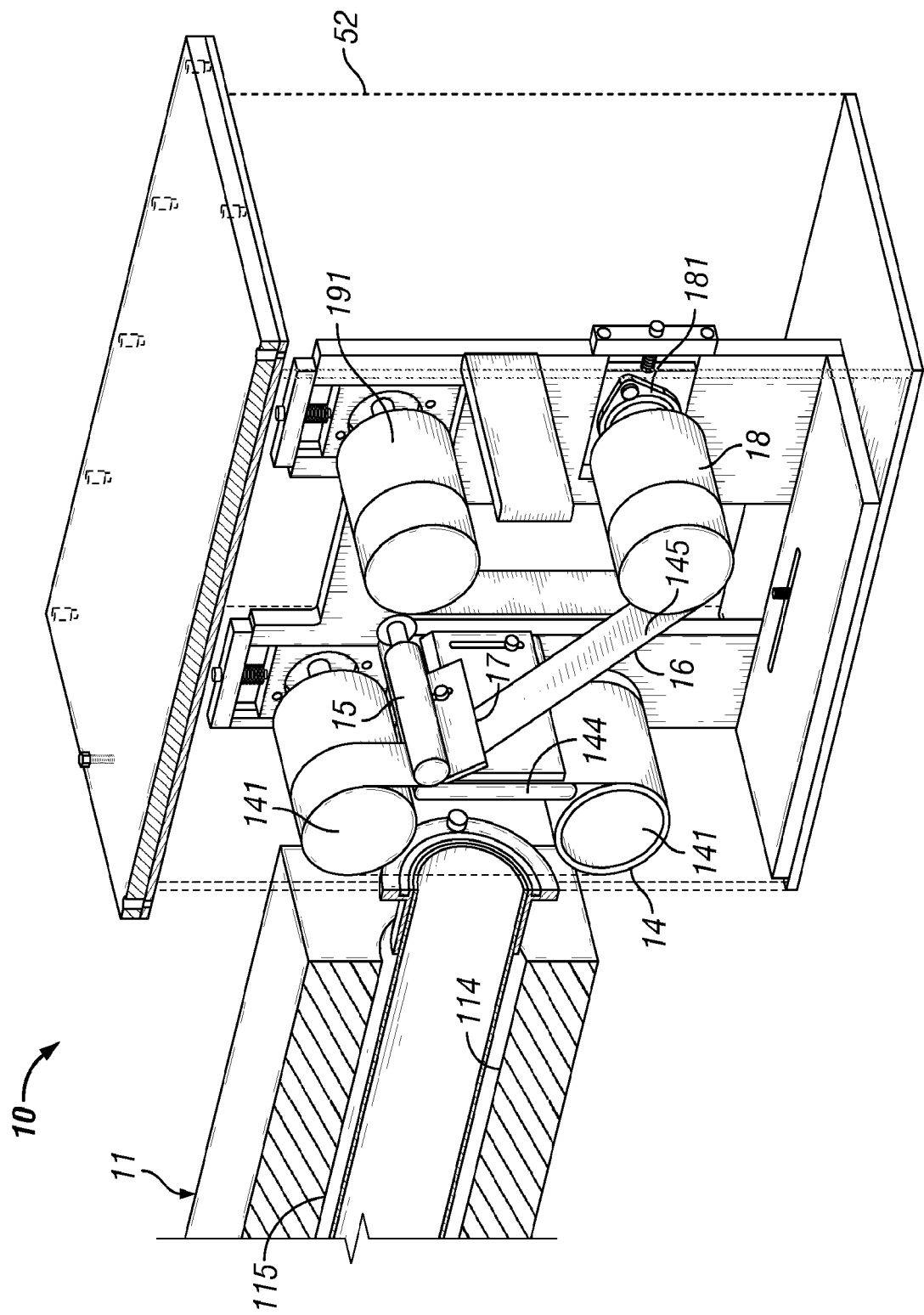

Referring now to FIGS. 1 and 2, there is illustrated, in accordance with one embodiment of the present disclosure, a system 10 for collecting synthesized nanofibrous or nanomaterials, such as nanotubes, made from a CVD process within a synthesis chamber 11, and for subsequently forming bulk woven or nonwoven, in this embodiment nonwoven sheets from the nanotubes which may find use as a filter in the present disclosure. In particular, system 10 may be used in the formation of a substantially continuous nonwoven sheet generated from compacted and intermingled nanotubes and having sufficient structural integrity to be handled as a sheet.

System 10 may be coupled to a synthesis chamber 11. Synthesis chamber 11 generally includes: (i) an entrance end into which reaction gases may be supplied, (ii) a hot zone where synthesis of extended length nanotubes may occur, and (iii) an exit end 114 from which the products of the reaction, namely extended length nanotubes and exhaust gases, may exit and be collected. In one embodiment, synthesis chamber 11 may include a quartz or ceramic tube 115 extending through a furnace and may include flanges 117 provided at exit end 114 and entrance end for sealing tube 115. Although illustrated generally in FIG. 1, it should be appreciated that other configurations may be employed in the design of synthesis chamber 11.

System 10 further includes a housing 52. Housing 52, as illustrated in FIG. 1, may be substantially airtight to minimize the release of potentially hazardous airborne particulates that are contained within the synthesis chamber 11 into the environment, and to prevent oxygen from entering into the system 10 and reaching the synthesis chamber 11. In particular, the presence of oxygen within the synthesis chamber 11 can affect the integrity and compromise the production of the nanotubes.

System 10 may also include an inlet 13 for engaging the flanges 117 at exit end 114 of synthesis chamber 11 in a substantially airtight manner. In one embodiment, inlet 13 may include at least one gas exhaust 131 through which gases and heat may leave the housing 52. Gas exiting from exhaust 131 may be allowed to pass through a liquid, such as water, or a filter to collect nanomaterials not gathered upstream of the exhaust 131. In addition, the exhaust gas may be treated in a manner similar to that described above. Specifically, the exhaust gas may be treated with a flame in order to de-energize various components of the exhaust gas. For instance, reactive hydrogen in the exhaust gas may be oxidized to form water.

System 10 may further include a moving surface, such as belt 14, situated adjacent inlet 13 for collecting and transporting the nanomaterials (i.e., nanotubes) from exit end 114 of synthesis chamber 11. To collect the nanomaterials, belt 14 may be positioned at an angle substantially transverse to the flow of gas carrying the nanomaterials from exit end 114 to permit the nanomaterials to be deposited onto belt 14. In one embodiment, belt 14 may be positioned substantially perpendicularly to the flow of gas and may be porous in nature to allow the flow of gas carrying the nanomaterials to pass therethrough and exit from the synthesis chamber 11. The flow of gas from the synthesis chamber 11 may, in addition, exit through exhaust 131 in inlet 13. In addition, belt 14 may be made from a ferromagnetic material so as to attract the nanomaterials thereonto.

To carry the nanomaterials away from the inlet 13 of system 10, belt 14 may be designed as a continuous loop similar to a conventional conveyor belt. To that end, belt 14 may be looped about opposing rotating elements 141 and may be driven by a mechanical device, such as electric motor 142, in a clockwise manner as illustrated by arrows 143. Alternatively, a drum (not shown) may be used to provide the moving surface for transporting the nanomaterials. Such a drum may also be driven by a mechanical device, such as electric motor 142. In an embodiment, electric motor 142 may be controlled through the use of a control system, similar to that used in connection with mechanical drives (not shown) so that tension and velocity can be optimized.

With continued reference to FIG. 1, system 10 includes a pressure applicator, such as roller 15, situated adjacent belt 14 to apply a compacting force (i.e., pressure) onto the collected nanomaterials. In particular, as the nanomaterials get transported toward roller 15, the nanomaterials on belt 14 may be forced to move under and against roller 15 such that pressure may be applied to the intermingled nanomaterials while the nanomaterials get compacted between belt 14 and roller 15 and into a coherent substantially bonded planar nonwoven sheet 16 (see FIG. 2). To enhance the pressure against the nanomaterials on belt 14, a plate 144 may be positioned behind belt 14 to provide a hard surface against which pressure from roller 15 can be applied. It should be noted that the use of roller 15 may not be necessary should the collected nanomaterials be ample in amount and sufficiently intermingled such that an adequate number of contact sites exists to provide the necessary bonding strength to generate the nonwoven sheet 16.

To disengage the nonwoven sheet 16 of intermingled nanomaterials from belt 14 for subsequent removal from housing 52, a scalpel or blade 17 may be provided downstream of the roller 15 with its edge against surface 145 of belt 14. In this manner, as nonwoven sheet 16 moves downstream past roller 15, blade 17 may act to lift the nonwoven sheet 16 from surface 145 of belt 14.

Additionally, a spool or roller 18 may be provided downstream of blade 17 so that the disengaged nonwoven sheet 16 may be subsequently directed thereonto and wound about roller 18 for harvesting. In an embodiment, roller 18 may be made from a ferromagnetic material to attract the nanomaterials in nonwoven sheet 16 thereonto. Of course, other mechanisms may be used so long as the nonwoven sheet 16 can be collected for removal from the housing 52 thereafter. Roller 18, like belt 14, may be driven in by a mechanical drive, such as an electric motor 181, so that its axis of rotation may be substantially transverse to the direction of movement of the nonwoven sheet 16.

In order to minimize bonding of the nonwoven sheet 16 to itself as it is being wound about roller 18, a separation material 19 (see FIG. 2) may be applied onto one side of the nonwoven sheet 16 prior to the sheet 16 being wound about roller 18. The separation material 19 for use in connection with the present disclosure may be one of various commercially available metal sheets or polymers that can be supplied in a continuous roll 191. To that end, the separation material 19 may be pulled along with the nonwoven sheet 16 onto roller 18 as sheet 16 is being wound about roller 18. It should be noted that the polymer comprising the separation material 19 may be provided in a sheet, liquid, or any other form so long as it can be applied to one side of nonwoven sheet 16. Moreover, since the intermingled nanomaterials within the nonwoven sheet 16 may contain catalytic nanoparticles of a ferromagnetic material, such as Fe, Co, Ni, etc., the separation material 19, in one embodiment, may be a non-magnetic material, e.g., conducting or otherwise, so as to prevent the nonwoven sheet 16 from sticking strongly to the separation material 19.

Furthermore, system 10 may be provided with a control system (not shown) so that rotation rates of mechanical drives 142 and 181 may be adjusted accordingly. In one embodiment, the control system may be designed to receive data from position sensors, such as optical encoders, attached to each of mechanical drives 142 and 181. Subsequently, based on the data collected, the control system may use a control algorithm in order to modify power supplied to each drive in order to control the rate of each drive so that they substantially match the rate of nanotube collection on belt 14 to avoid compromising the integrity of the nonwoven sheet as it is being wound about the spool. Additionally, the control system can act to synchronize a rate of spin of the roller 18 to that of belt 14. In one embodiment, tension of the nonwoven sheet 16 can be reset in real time depending on the velocity values so that the tension between the belt 14 and roller 18 can be kept within a set value.

The control system, if necessary can also vary the rate between the roller 18 and belt 14 to control the uptake of the nonwoven sheet 16 by roller 18. In addition, the control system can cause the roller 18 to adjust slightly back and forth along its axis so as to permit the nonwoven sheet 16 to evenly remain on roller 18.

To the extent desired, an electrostatic field (not shown) may also be employed to align the nanotubes generated from synthesis chamber 11 approximately in a direction of belt motion. The electrostatic field may be generated by placing, for instance, two or more electrodes circumferentially about the exit end 114 of synthesis chamber 11 and applying a high voltage to the electrodes. The voltage may vary from about 10 V to about 100 kV, and preferably from about 4 kV to about 6 KV. If necessary, the electrodes may be shielded with an insulator, such as small quartz or other suitable insulator. The presence of the electric field can cause the nanotubes moving therethrough to substantially align with the field so as to impart an alignment of the nanotubes on moving belt 14.

Alignment of the nanotubes may also be implemented through the use of chemical and/or physical processes. For instance, the nonwoven nanotubes may be slightly loosened with chemical(s) and physically stretched to substantially align the nanotubes along a desired direction.

Figure 2A:
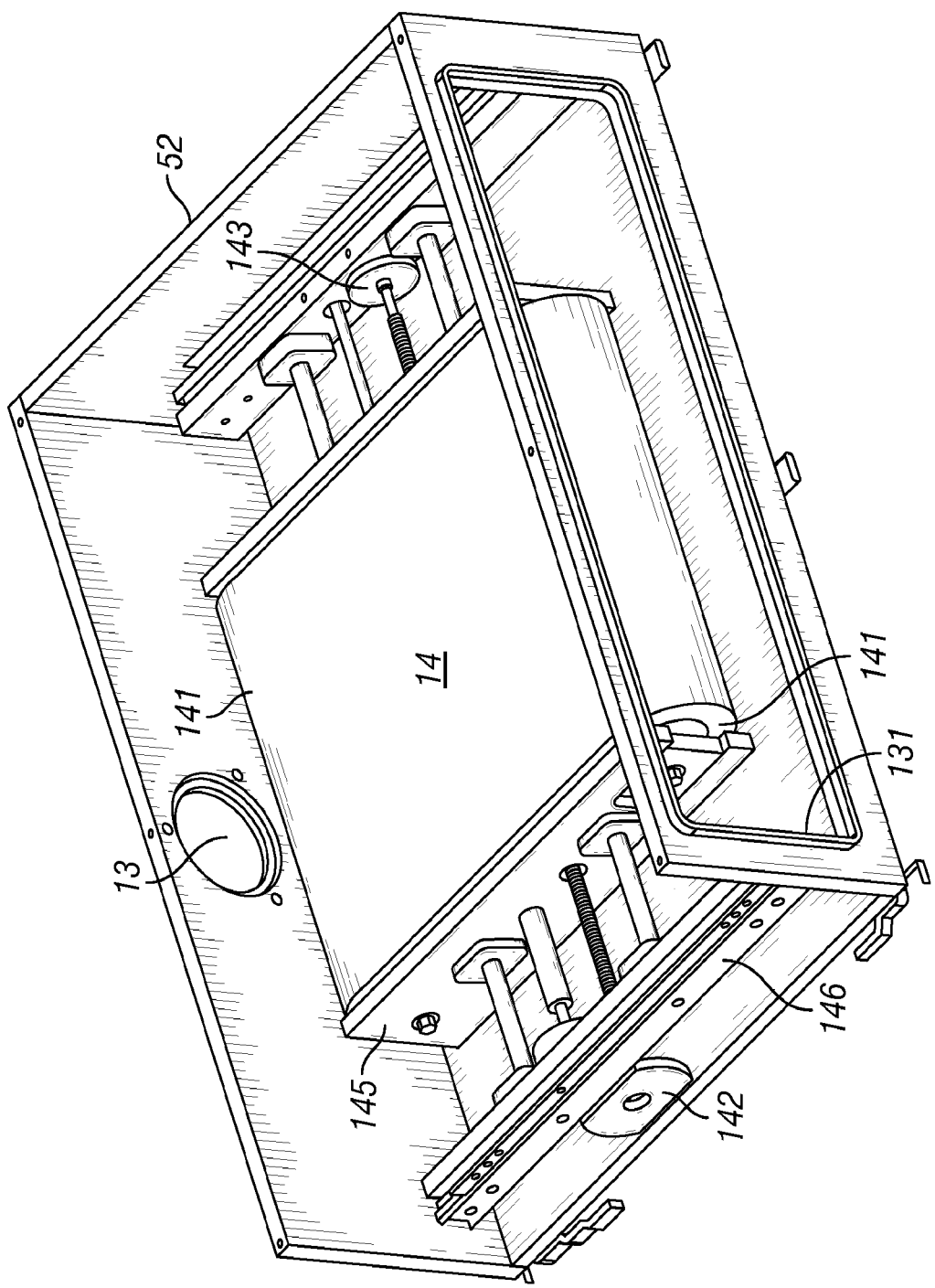
FIG. 2A illustrates an alternate system for formation and harvesting of a nonwoven sheet of entangled carbon nanotubes in accordance with an embodiment of the present disclosure.

In an alternate embodiment, with reference to FIG. 2A, a modified housing for collecting nanomaterials may be used. The modified housing 52 in FIG. 2A may include an inlet 13 through which the nanomaterials enter from the synthesis chamber 11 of system 10, and an outlet 131, through which nonwoven sheet 16 may be removed from housing 52. In one embodiment, housing 52 may be designed to be substantially airtight to minimize the release of potentially hazardous airborne particulates from within the synthesis chamber 11 into the environment, and to prevent oxygen from entering into the system 10 and reaching the synthesis chamber 11. In particular, the presence of oxygen within the synthesis chamber 11 can affect the integrity and compromise the production of the nanotubes.

Housing 52 of FIG. 2A may further include an assembly 145 having a moving surface, such as belt 14. As illustrated, belt 14 may be situated adjacent inlet 13 for collecting and transporting the nanomaterials, i.e., nanotubes, exiting from synthesis chamber 11 into the housing 52. In the embodiment shown in FIG. 2A, belt 14, and thus assembly 145, may be situated substantially parallel to the flow of gas carrying the nanomaterials entering into housing 52 through inlet 13 so as to permit the nanomaterials to be deposited on to belt 14. In one embodiment, belt 14 may be made to include a material, such as a magnetic material, capable of attracting the nanomaterials thereonto. The material can vary depending on the catalyst from which the nanotubes are being generated. For example, if the nanomaterials are generated from using a particle of iron catalyst, the magnetic material may be a ferromagnetic material.

To carry the nanomaterials away from the inlet 13 of housing 52, belt 14 may be designed as a substantially continuous loop similar to a conventional conveyor belt. To that end, belt 14, in an embodiment, may be looped about opposing rotating elements 141 and may be driven by a mechanical device, such as rotational gearing 143 driven by a motor located at, for instance, location 142. In addition, belt 14 may be provided with the ability to translate from one side of housing 52 to an opposite side of housing 52 in front of the inlet 13 and in a direction substantially transverse to the flow of nanomaterials through inlet 13. By providing belt 14 with this ability, a relative wide nonwoven sheet 16 may be generated on belt 14, that is, relatively wider than the flow of nanomaterials into housing 52. To permit belt 14 to translate from side to side, translation gearing 144 may be provided to move assembly 145 on which rollers 141 and belt 14 may be positioned.

Once sufficient nanomaterials have been deposited onto belt 14 to provide the nonwoven sheet 16 with an appropriate thickness, the nonwoven sheet 16 can be removed from housing 52 of FIG. 2A. To remove the nonwoven sheet 16, system 10 may be shut down and the nonwoven sheet 16 extracted manually from belt 14 and removed from housing 52 through outlet 131. In order to permit ease of extraction, assembly 145, including the various gears, may be mounted onto a sliding mechanism, such as sliding arm 146, so that assembly 145 may be pulled from housing 52 through outlet 131. Once the nonwoven sheet 16 has been extracted, assembly 145 may be pushed back into housing 52 on sliding arm 146. Outlet 131 may then be closed to provide housing 52 with a substantially airtight environment for a subsequent run.

Figure 3:
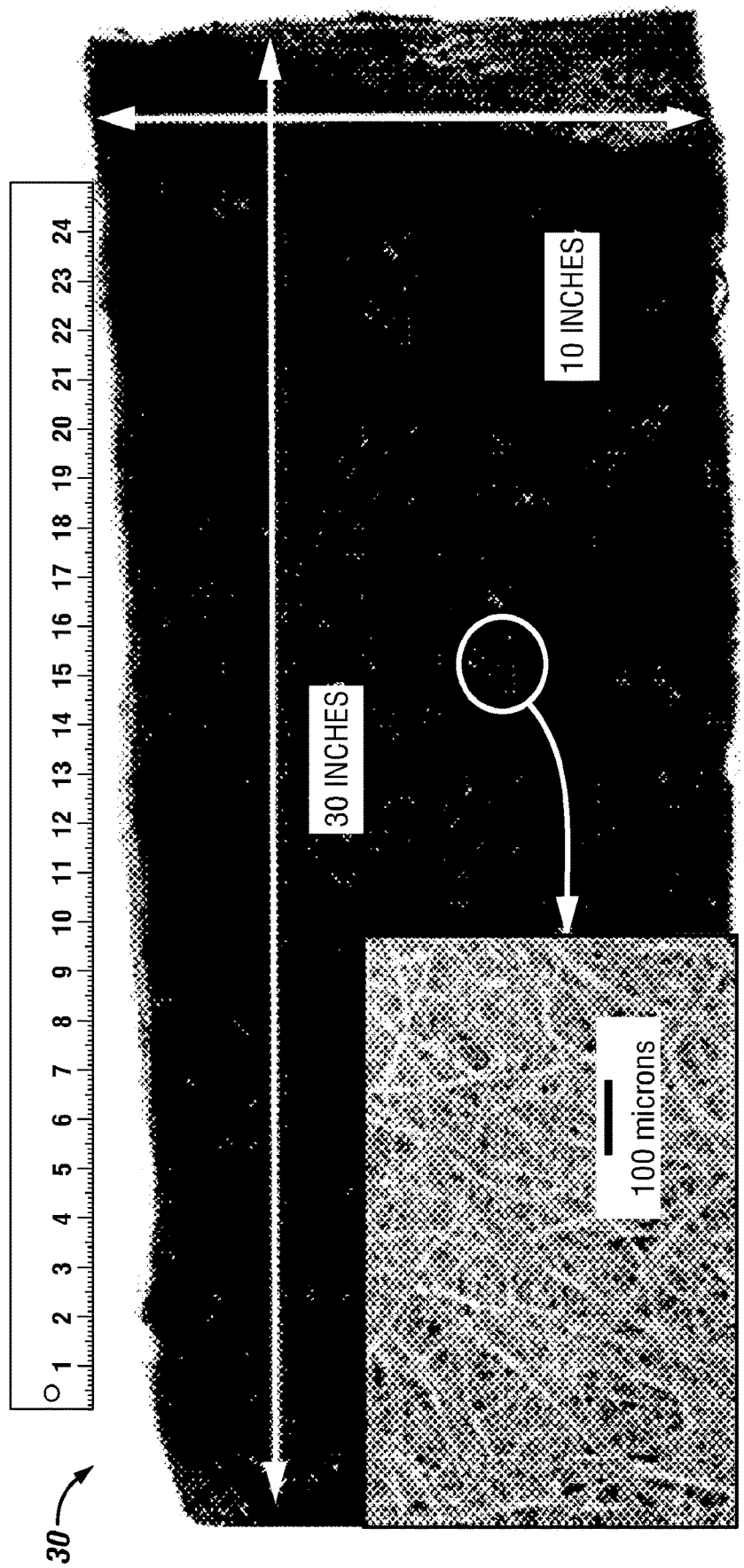
FIG. 3 illustrates the nonwoven sheet of entangled carbon nanotubes generated from the system of FIGS. 1, 2, and 2A.

According to one embodiment, nonwoven sheets of carbon nanomaterials may be created by a CVD process using system 10 shown in FIGS. 1, 2 and 2A and are characterized as having one or more of the following characteristics: (i) a diameter of between about 2-20 nm or between about 6-15 nm or between about 7-10 nm, (ii) a length of between about 1-10 mm or between about 2-8 mm or between about 3-6 mm, (iii) a density of between about 0.7-9 g/cm$^3$ or between about 0.8-7 g/cm$^3$ or between about 0.9-5 g/cm$^3$, (iv) an aspect ratio of at least about 250,000, or at least about 500,000 or at least about 750,000 or at least about 1,000,000 and (v) a surface area between about 100-300 m²/g or between about 150-250 m²/g or between about 175-200 m²/g. Nanotubes are created in the gas phase and deposited on a moving belt as noted above. A plurality of layers may be necessary to build the nonwoven sheet to the above density. An example of such a nonwoven sheet is shown in FIG. 3 as item 30.

The nonwoven sheet 30 may be made from either single wall (SWNT) or multiwall (MWNT) carbon nanotubes and is electrically conductive. Accordingly, the nonwoven sheet 30 may be quickly heated by electrical energy that is in electrical communication with the nonwoven sheet. The nonwoven sheet 30 manufactured from system 10 may also be substantially pure in carbon nanotubes and can maintain its shape with substantially no bonding agents present. The ability of nonwoven sheet 30 to maintain its shape may come from the pressure applied by roller 15 (see above) to the intermingled carbon nanotubes so as to compact the nanotubes between belt 14 and roller 15 into a coherent substantially bonded planar nonwoven sheet. As for its purity, it should be noted that although nonwoven sheets with substantially pure carbon nanotubes can be manufactured, nonwoven sheets having residual catalyst in the carbon nanotubes made from the CVD process can also be used. Typically, residual catalyst (i.e., metal catalyst), in such nonwoven sheets can be less than about 2 atomic percent. Using nonwoven sheets with residual catalyst may reduce overall processing costs.

Due to its thermal conduction characteristics, the nonwoven sheet 30 can also provide thermal protection by being thermally conductive within the plane of the sheet 30 while not being thermally conductive in a direction substantially normal to this plane. Moreover, because the carbon nanotubes may be substantially resistant to high temperature oxidation, the nonwoven sheet 30 made from the carbon nanotubes generally can withstand (i.e., does not burn) temperatures up to about 500° C.

Electrical sources (for e.g., a battery solar cell or generator) may be connected to the nonwoven sheet of the present disclosure in any suitable manner. In an embodiment, an input, such as one or more leads, may be connected mechanically, for example, via crimping. In another embodiment, a conductive material, such as silver ink, may be deposited onto the nonwoven to provide a suitable input or lead. In yet another embodiment, a glassy carbon precursor may be applied between the nonwoven sheet and a metallic lead or other suitable input to enhance conductivity between the nanotubes of the nonwoven sheet and the metallic lead or other suitable input.

Figure 4:
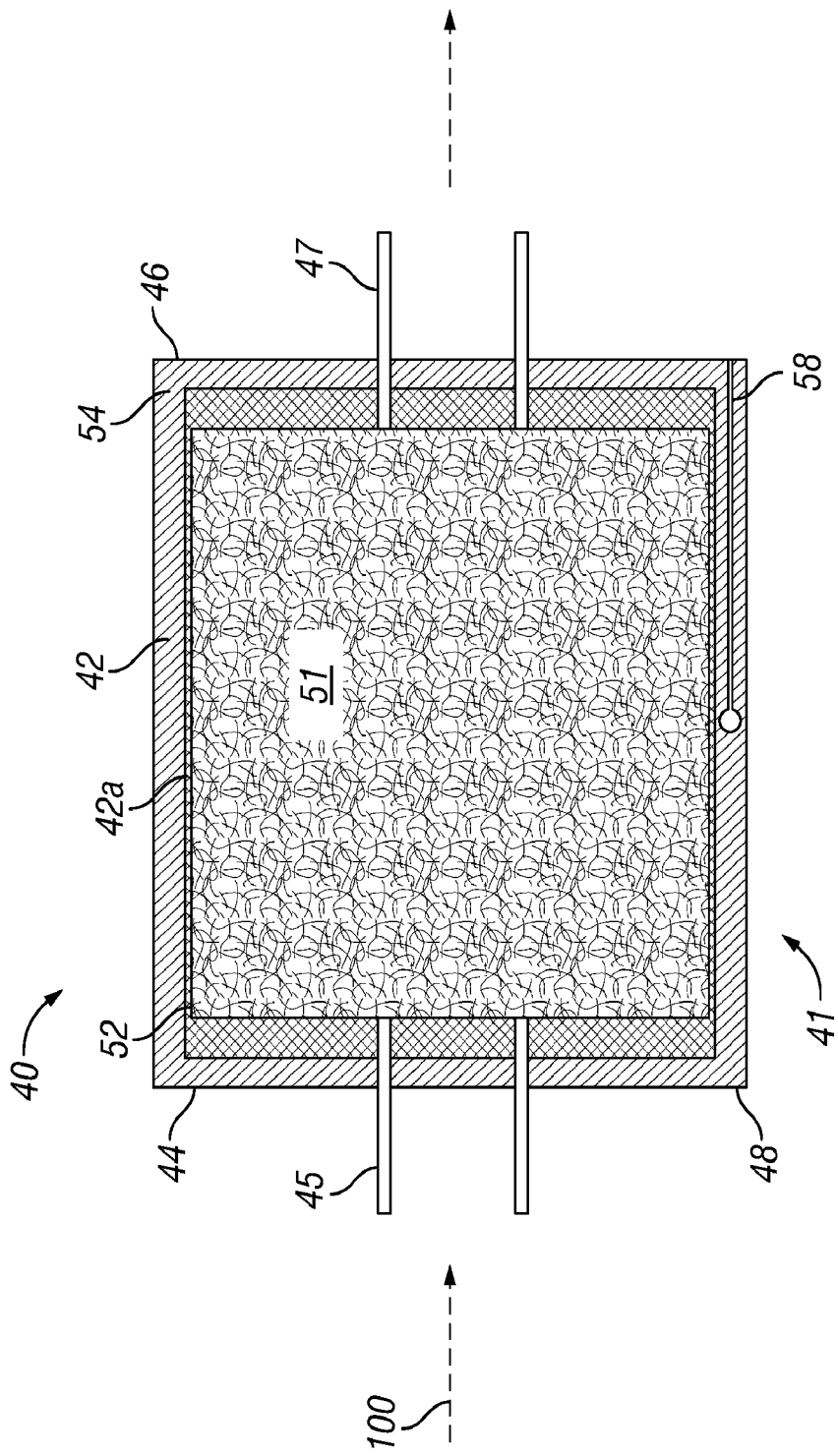
FIG. 4 illustrates a filter containing the nonwoven sheet of entangled carbon nanotubes generated from the system of FIGS. 1, 2 and 2A.

Referring now to FIG. 4, there is shown a filter 40, such as an air filter, comprising one or more woven or nonwoven sheets of carbon nanotubes 51 according to the present disclosure. The filter generally includes a housing that defines a flow pathway between an inlet and an outlet, and the woven or nonwoven sheet of carbon nanotubes 51 is disposed transverse to the flow pathway to cause a gaseous medium containing one or more contaminants to flow through the woven or nonwoven sheet and into the carbon nanotubes to adsorb such contaminants.

Thus, the filter 40 will include a housing 41 having a body 42, such as a tubular body, closed at one end by an inlet wall 44 and at the opposite end by an outlet wall 46. Inlet wall 44 has one or more inlet port(s) 45 while outlet wall 46 has one or more outlet ports 47.

One or more annular cavities or chambers 48 are arranged co-axially along the inner surface of the tubular body 42, between the inlet wall 44 and outlet wall 46. In the embodiment shown, one annular chamber 48 is defined between the inlet wall 44 and outlet wall 46. In embodiments where there is more than one annular chamber 48, radially-extending dividing walls (not shown) can be axially spaced in the direction of the flow axis 100 of the inlet port(s) 45. It will be evident that flow axis 100 lies parallel to the longitudinal axis of the filter 40 as a whole.

Figure 4A:
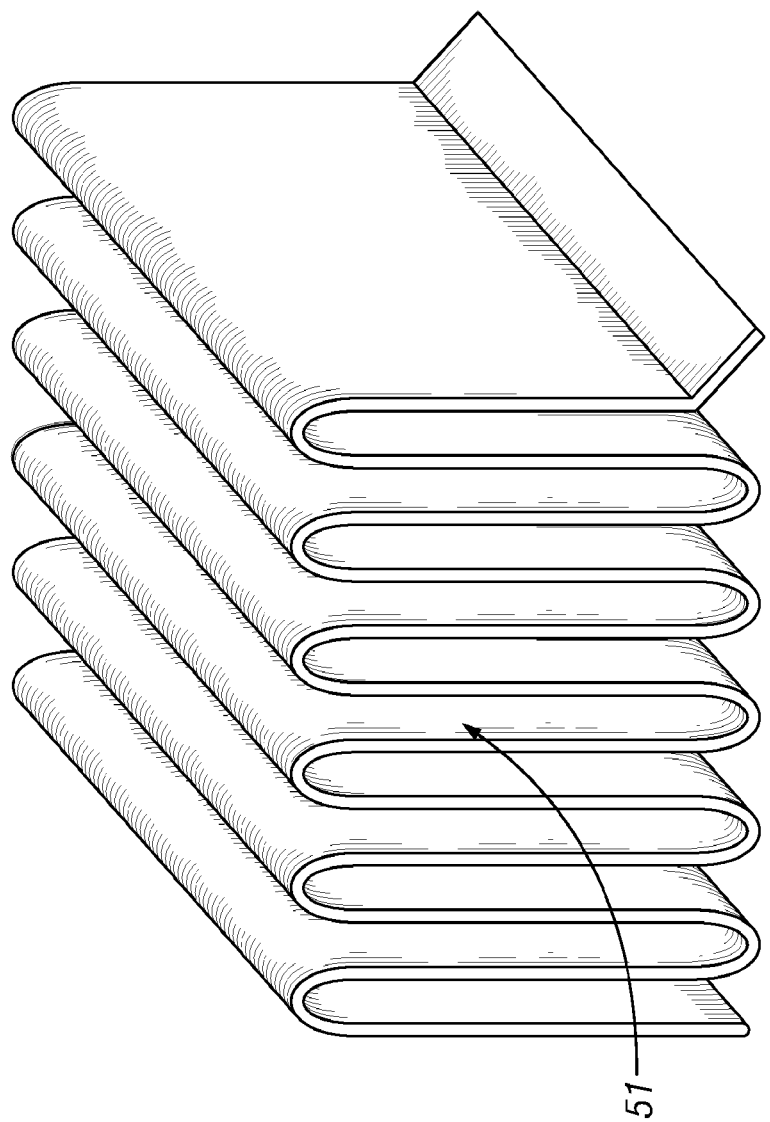
FIG. 4A illustrates the nonwoven sheet of entangled carbon nanotubes of FIG. 4 in a pleated configuration.

Each chamber 48 may contain at least one woven or nonwoven sheet of carbon nanotubes 51, which is surrounded—and which may also be supported—by the inlet and outlet walls 44, 46 and inner surface 42a of the tubular body 42 defining each chamber 48. Fine porous members 52, 54 may be provided in or adjacent to the inlet and outlet walls 44, 46 to ensure that the woven or nonwoven sheet 51 does not leave the housing 41. In some embodiments, the fine porous member(s) may be a particulate filter configured to collect fine dust. The woven or nonwoven sheet 51 may be placed within the chamber 48 in any desired configuration so long as the gaseous medium passes through the woven or nonwoven sheet 51, such as, but not limited to, in a flat or planar configuration (i.e., the first and second dimensions are substantially larger e.g., at least 1000-fold than the third dimension) or in a pleated (fin) configuration (see FIG. 4A). Accordingly, the contaminated gaseous medium will enter the inlet 45, pass through the woven or nonwoven sheet 51 onto which at least one contaminant is adsorbed and then exit the outlet 47 as a gaseous medium having a reduced concentration of the at least one contaminant.

In one embodiment, the woven or nonwoven sheet of carbon nanotubes is configured to emit infrared energy and includes an input 58 for receiving energy from a power source. Thus, the power source is in electrical communication with the woven or nonwoven sheet of carbon nanotubes 51 via the input 58. Electrical energy may be supplied by the power source to the woven or nonwoven sheet 51 intermittently or at programmed intervals. The current passing through the woven or nonwoven sheet 51 will rapidly increase the temperature of the contaminants that have been adsorbed thereon subsequently leading to desorption or decomposition of the contaminants from the woven or nonwoven sheet and back into the gaseous medium flowing therethrough. Accordingly, the filter 40 may be quickly and efficiently regenerated in place using minimal power.

Figure 5:
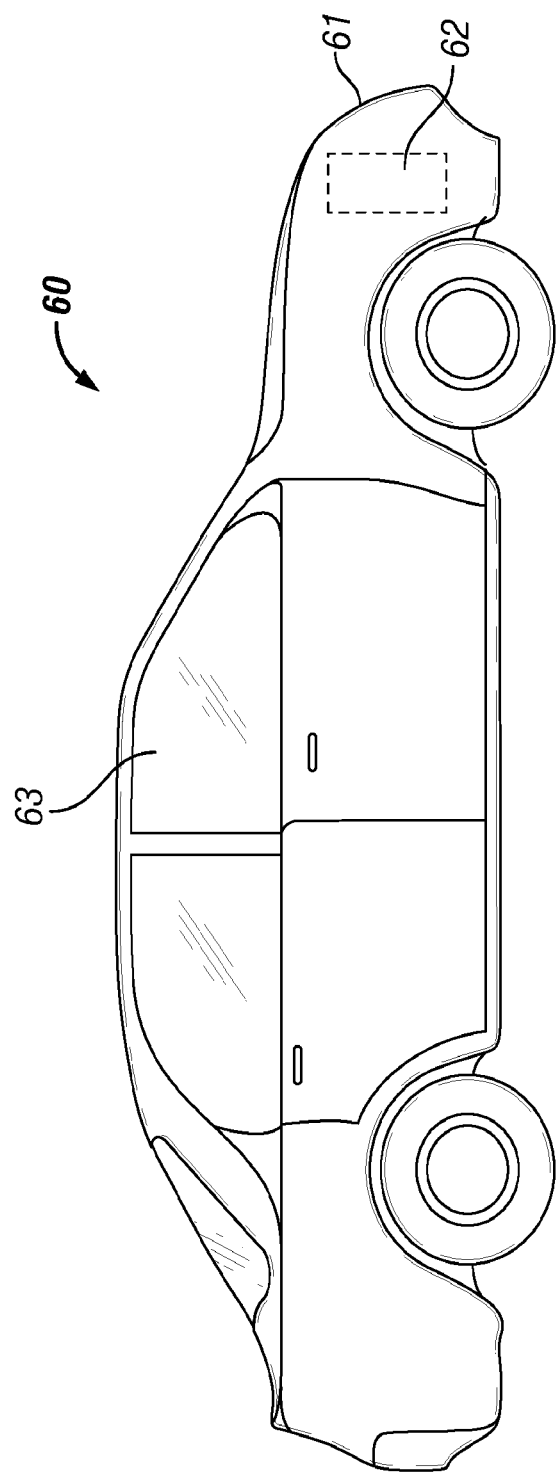
FIG. 5 illustrates a vehicle in which the nonwoven sheet of entangled carbon nanotubes generated from the system of FIGS. 1, 2 and 2A may be used.

According to one particular embodiment, the woven or nonwoven sheet of carbon nanotubes of the present disclosure may find use in a cabin air filter for a heating, ventilation and air conditioning (HVAC) system of a vehicle. With reference to FIG. 5, a vehicle 60 is shown. The vehicle 60 may be an automobile (for e.g. gas, electric or hybrid), although the type of vehicle is not limited thereto. The vehicle 60 comprises a front end 61. The HVAC system 62 is disposed in the vehicle 60 and provides heating, ventilation and air conditioning to an interior space 63 of the vehicle 60. The interior space 63 is typically arranged to receive one or more occupants.

Figure 6:
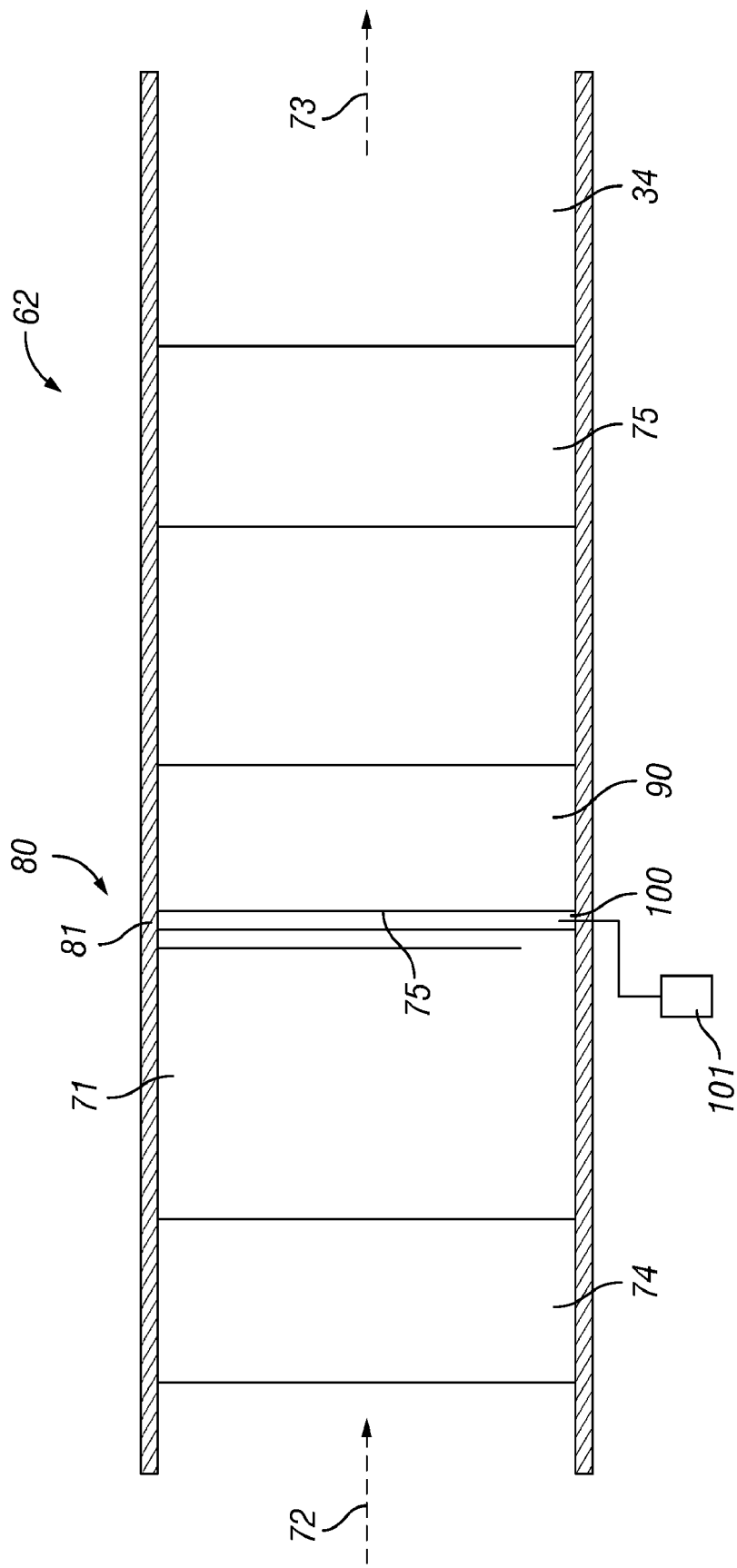
FIG. 6 illustrates a cross-sectional, side view of part of a heating, ventilation and air conditioning (HVAC) system for use in the vehicle of FIG. 5.

The HVAC system 62 is shown in more detail in FIG. 6. The HVAC system 62 comprises a flow path 71 along which air flows. The air passes along the flow path 71 from an inlet 72 to an outlet 73. The inlet 72 is open to the external atmosphere around the vehicle 60 and the outlet 73 vents to the interior space 63. However, alternative arrangements are possible. A fan 74, acting as an air flow means, is disposed along the flow path 71. The fan 74 acts to move air along the flow path 71. In the present embodiment the fan 74 is proximate to the inlet 72. In one embodiment, the HVAC system 62 has a recirculation configuration in which the inlet 72 and outlet 73 are open to the interior space 63 and a normal configuration in which the inlet 72 and/or outlet 73 are open to the external atmosphere around the vehicle.

An evaporator 75 may also be disposed in the flow path 71. The evaporator 75 is disposed so that air flowing along the flow path 71 flows through the evaporator 75 prior to flowing through the outlet 73. In some embodiments, the evaporator 75 may be omitted.

The HVAC system 62 comprises an adsorption filter apparatus 80. The adsorption filter apparatus 80 is disposed along the flow path 71. A duct 81 defines part of the flow path 71 at the adsorption filter apparatus 80. The adsorption filter apparatus 80 is configured to remove at least one contaminant from the air flowing through the HVAC system 62.

The adsorption filter apparatus 80 is disposed upstream of the evaporator 75. With air flowing from the inlet 72 to the outlet 73, upstream is defined as on an inlet side of the air flow relative to another feature, and downstream is defined as on an outlet side of the air flow relative to another feature. The adsorption filter apparatus 80 may be spaced apart from the evaporator 75.

Figure 7:
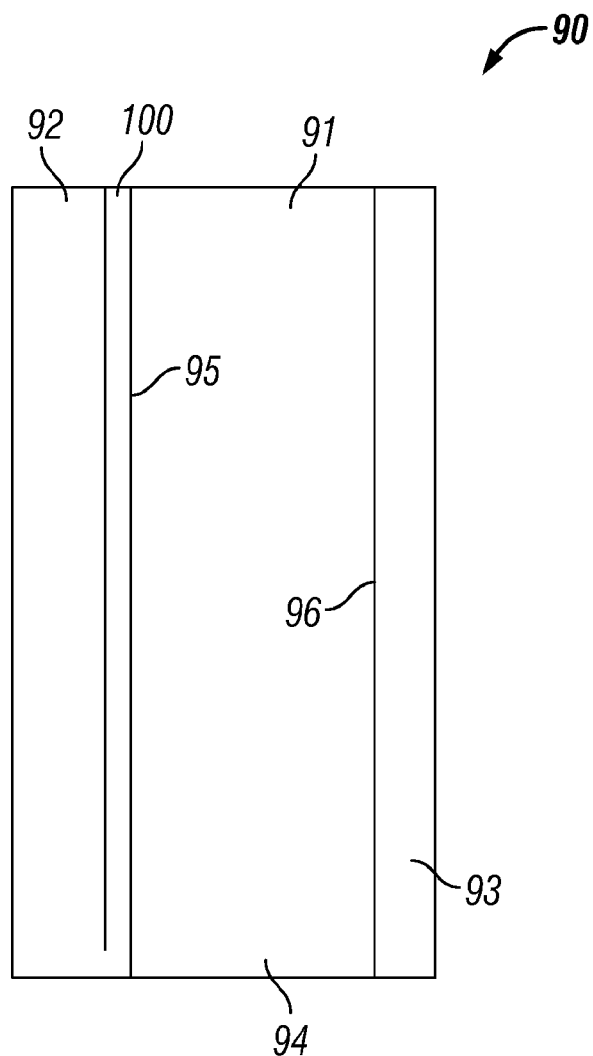
FIG. 7 illustrates a cross-sectional, side view of a filter module of the HVAC system of FIG. 6.

Referring to FIGS. 6 and 7, the adsorption filter apparatus 80 comprises a filter module 90 and an input 100 configured to be in electrical communication with a power source 101. The filter module 90 has an adsorption filter 91 and a particulate filter 92. The adsorption filter 91 and the particulate filter 92 are disposed in series in the flow path 71. The particulate filter 92 is disposed upstream of the adsorption filter 91. In the present embodiment, the particulate filter 92 abuts the adsorption filter 91. The particulate filter 92 may be omitted, or may be disposed elsewhere along the flow path 71.

The filter module 90 may also include a support 93, although in some embodiments support 93 may be omitted. The support 93 is configured to provide stability to the adsorption filter 91 and particulate filter 92. In one embodiment, the particulate filter 92 and support 93 are integrally formed. The adsorption filter 91 may be an adsorption filter layer. The particulate filter 92 may be a particulate filter layer. The support 53 may be a support layer. The filter module 90, in such a configuration, is a combined cabin air filter. In one embodiment the filter module 90 (i.e., the particulate filter 92 and adsorption filter 91) has a pleated configuration.

The particulate filter 92 is configured to filter fine particulates, such as dust, carried in the air flow. The particulate filter 92 extends across the flow path 71. That is, the particulate filter 92 is configured so that all air flowing along the flow path 71 flows through the particulate filter 92. The particulate filter 92 comprises fibres in a non-woven arrangement. The fibres in one embodiment may be, for example, glass fibres. The particulate filter 92 may comprise filter sections of differing coarseness to filter different sizes of particulates.

The adsorption filter 91 is configured to adsorb gaseous contaminants in the air flow. The adsorption filter 91 extends across the flow path 71. That is, the adsorption filter 91 is configured so that all air flowing along the flow path 71 flows through the adsorption filter 91. The adsorption filter 91 is bounded by the duct 81. The adsorption filter 91 comprises at least one woven or nonwoven sheet of carbon nanotubes according to the present disclosure 54. The woven or nonwoven sheet of carbon nanotubes adsorbs at least one gaseous contaminant in the air such that the gaseous contaminant(s) are retained by the adsorption filter 91. The adsorption filter 91 has an upstream side 95 and a downstream side 96. Air flows into the adsorption filter 91 through the upstream side 95 and flows from the adsorption filter 91 through the downstream side 96. Accordingly, contaminated air will flow into the adsorption filter 91 through the upstream side 95, pass through the woven or nonwoven sheet(s) of carbon nanotubes 94 onto which at least one contaminant is adsorbed and then exit through the downstream side 96 as air having a reduced concentration of the at least one contaminant. The air leaving the downstream side 96 may be recirculated back into the vehicle 60 or passed to the external atmosphere around the vehicle 60.

Thus, in operation, air is drawn along the flow path 71 by the fan 74. Downstream from the fan 74, the air flows along the duct 81 and enters the upstream side 75 of the adsorption filter 91. The gaseous contaminants passing into the adsorption filter 91 are adsorbed on a continuous basis by the woven or nonwoven sheet of carbon nanotubes 94 and so are retained in the filter 91. As such, the adsorbed contaminants are prevented from flowing from the downstream side 76 of the adsorption filter 91.

Regeneration of the adsorption filter 91 involves turning the power source on to resistively heat the contaminants adsorbed by the nonwoven sheet(s) of carbon nanotubes 94 to a temperature of at least about 200° C. or at least about 250° C. or at least about 300° C. thereby driving the gaseous contaminants out of carbon nanotube matrix. As air flow passes from the upstream side to the downstream side of the adsorption filter 91, the contaminants will be transferred to the air and thus can be passed to the external atmosphere around the vehicle 60. The power source 101 is then turned off and the adsorption filter 91 is allowed to adsorb contaminants until the next regeneration.

It will be understood that the power source 101 may be used intermittently or at programmed intervals and is operable to cleanse the adsorption filter 91 such that the adsorption filter 91 does not become saturated with adsorbed pollutants, or reach or exceed adsorption capacity. This may be especially suitable for electric vehicles. In such an embodiment, as the vehicle is charging and energy is therefore available, a desorption cycle could be activated by passing a current through the adsorption filter apparatus 91 to desorb the gaseous contaminants that have been adsorbed thereon and exhaust the gaseous contaminants to the external atmosphere. Benefits of such an embodiment may include reduced maintenance and elimination of waste from a state of the art disposable adsorption filter containing activated carbon.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A filter for removing contaminants from a liquid or gaseous medium comprising a nonwoven sheet of entangled carbon nanotubes having a length of between 1-10 mm, wherein the entangled carbon nanotubes are further characterized as having two or more of the following characteristics: (i) a diameter of between about 2-20 nm, (ii) a density of between about 0.7-1.9 g/cm$^3$, (iii) an aspect ratio of at least about 250,000, (iv) a strain to failure of between about 1.8-7%, and (v) a surface area from about 100-300 m$^2$/g and wherein the nonwoven sheet further comprises an input configured for receiving energy from a power source.

2. A method of purifying a liquid or gaseous medium containing one or more contaminants by contacting the liquid or gaseous medium with filter of claim 1, wherein the carbon nanotubes are present in the nonwoven sheet in an amount sufficient to reduce the concentration of at least one contaminant in the liquid or gaseous medium that comes into contact with the nonwoven sheet.

3. A cabin air filter comprising a housing having an inlet, an outlet, a cavity positioned between the inlet and outlet and a nonwoven sheet of entangled carbon nanotubes having a length of between 1-10 mm, wherein the entangled carbon nanotubes are further characterized as having two or more of the following characteristics: (i) a diameter of between about 2-20 nm, (ii) a density of between about 0.7-1.9 $g/cm^3$, (iii) an aspect ratio of at least about 250,000, (iv) a strain to failure of between about 1.8-7%, and (v) a surface area from about 100-300 $m^2/g$ disposed within the cavity and wherein the nonwoven sheet further includes an input configured to receive electrical energy from a power source.

4. The cabin air filter of claim 3, wherein the nonwoven sheet is disposed within the cavity in a pleated configuration.

5. The cabin air filter of claim 4 further comprising a particulate filter disposed within the cavity.

* * * * *